United States Patent
Haider et al.

(10) Patent No.: US 8,677,144 B2
(45) Date of Patent: Mar. 18, 2014

(54) SECURE SOFTWARE AND HARDWARE ASSOCIATION TECHNIQUE

(75) Inventors: Amer Haider, Saratoga, CA (US);
Muhammad R. Hussain, Saratoga, CA (US); Richard E. Kessler, Shrewsbury, MA (US); Imran Badr, Freemont, CA (US)

(73) Assignee: Cavium, Inc., San Jose, CA (US)

( * ) Notice: Subject to any disclaimer, the term of this patent is extended or adjusted under 35 U.S.C. 154(b) by 1004 days.

(21) Appl. No.: 12/392,004

(22) Filed: Feb. 24, 2009

(65) Prior Publication Data

US 2009/0217054 A1    Aug. 27, 2009

Related U.S. Application Data

(60) Provisional application No. 61/067,001, filed on Feb. 25, 2008.

(51) Int. Cl.
    *G06F 21/00* (2013.01)

(52) U.S. Cl.
    USPC .......................................................... 713/189

(58) Field of Classification Search
    USPC .......................................................... 713/189
    See application file for complete search history.

(56) References Cited

U.S. PATENT DOCUMENTS

| | | | | |
|---|---|---|---|---|
| 4,278,837 A * | 7/1981 | Best | ................................ | 713/190 |
| 5,469,363 A * | 11/1995 | Saliga | ............................. | 700/225 |
| 6,278,782 B1 * | 8/2001 | Ober et al. | ...................... | 380/264 |
| 6,289,455 B1 | 9/2001 | Kocher et al. | | |
| 7,181,620 B1 * | 2/2007 | Hur | ................................. | 713/171 |
| 7,188,089 B2 * | 3/2007 | Goldthwaite et al. | ........... | 705/67 |
| 7,206,943 B2 * | 4/2007 | Kobayashi et al. | ............. | 713/193 |
| 7,457,967 B2 | 11/2008 | Cocchi et al. | | |
| 7,490,245 B2 | 2/2009 | Waltermann | | |
| 7,712,131 B1 * | 5/2010 | Lethe | ............................... | 726/20 |
| 7,802,085 B2 | 9/2010 | Graunke | | |
| 7,979,703 B2 * | 7/2011 | Ellison et al. | .................. | 713/168 |
| 8,209,542 B2 | 6/2012 | Kumar | | |
| 2007/0240154 A1 * | 10/2007 | Gerzymisch et al. | .......... | 717/174 |
| 2008/0165765 A1 * | 7/2008 | Neuhaus | ........................ | 370/352 |
| 2008/0196081 A1 | 8/2008 | Hajji et al. | | |
| 2011/0010421 A1 * | 1/2011 | Chavez et al. | ................. | 709/204 |
| 2011/0035795 A1 * | 2/2011 | Shi | .................................... | 726/13 |
| 2012/0079287 A1 | 3/2012 | Leclercq | | |
| 2013/0019105 A1 | 1/2013 | Hussain | | |

OTHER PUBLICATIONS

Non-Final Office Action received in U.S. Appl. No. 13/184,199, dated Jan. 30, 2013.
Non-Final Office Action in U.S. Appl. No. 13/184,199; Entitled "Secure Software and Hardware Association Technique," Date Mailed: May 31, 2013.

(Continued)

*Primary Examiner* — Amare F Tabor
*Assistant Examiner* — Abiy Getachew
(74) *Attorney, Agent, or Firm* — Hamilton, Brook, Smith & Reynolds, P.C.

(57) ABSTRACT

In an embodiment, authenticated hardware and authenticated software are cryptographically binded using symmetric and asymmetric cryptography. Cryptographically binding the hardware and software ensures that original equipment manufacturer (OEM) hardware will only run OEM software. Cryptographically binding the hardware and software protects the OEM binary code so it will only run on the OEM hardware and cannot be replicated or altered to operate on unauthorized hardware. This cryptographic binding technique is referred to herein as secure software and hardware association (SSHA).

55 Claims, 7 Drawing Sheets

(56) References Cited

OTHER PUBLICATIONS

Notification of Transmittal of the International Search Report and the Written Opinion for Int'l Application No. PCT/US2013/033098; Entitled "Hardware and Software Association and Authentication," Date Mailed: Jun. 5, 2013.

Non-Final Office Action in U.S. Appl. No. 13/427,148; Entitled "Hardware and Software Association and Authentication," dated Sep. 10, 2013.

* cited by examiner

SECURE SOFTWARE AND HARDWARE ASSOCIATION TECHNIQUE

RELATED APPLICATION

This application claims the benefit of U.S. Provisional Application No. 61/067,001, filed on Feb. 25, 2008. The entire teachings of the above application are incorporated herein by reference.

BACKGROUND OF THE INVENTION

Companies are experiencing loss of revenue and brand equity due to device clones and unauthorized production of products. The target of this cloning activity is to leverage research and development of original equipment manufacturers (OEMs) illegally to offer similar and competing products at a lower cost which results in significant loss of profit and brand equity to the OEM. Examples include:

Non-branded Systems: Hardware designs are stolen and clone systems are built at lower quality. The manufacturers of such cloned systems also copy the software from the original product and offer a complete system (e.g., non-branded servers and routers) at very low cost.

Business Model Interruption: Hackers change the functionality of existing systems to behave and performance non-intended functions that disrupt the business model of OEMs. An example is the iPhone® which is currently licensed to work with only one service provider's network. Hackers have enabled the iPhone to be used with other service provider networks.

Overbuilding: Contractors can overbuild equipment beyond the OEM's order and sell the unauthorized equipment with the same brand but with lower price and no revenue to the OEM.

The Trusted Computing Group (TCG) is an industry group including component vendors, software developers, systems vendors and network and infrastructure companies that develops and supports open industry specifications for trusted computing across multiple platform types. TCG has defined a Trusted Platform Module (TPM) specification for microcontrollers that store keys, passwords and digital certificates. Security processes, such as digital signature and key exchange, are protected through the secure TCG subsystem. Access to data and secrets in a platform could be denied if the boot sequence is not as expected. Critical applications and capabilities such as secure email, secure web access and local protection of data are thereby made much more secure. The TPM is not capable of con-trolling the software that is executed. The TCG subsystem can only act as a 'slave' to higher level services and applications by storing and reporting pre-runtime configuration information. Other applications determine what is done with this information. At no time can the TCG building blocks 'control' the system or report the status of applications that are running.

SUMMARY OF THE INVENTION

Where is a need for a cryptographically secure technique that protects original equipment manufacturer (OEM) hardware and OEM program code from theft and unintended use by cryptographically binding authenticated OEM hardware with authenticated OEM program code using symmetric and asymmetric cryptography. OEM hardware may include OEM-approved hardware. Similarly, OEM program code may include OEM-approved program code. Cryptographically binding the hardware and program code ensures that OEM hardware will only run OEM program code. Cryptographically binding the hardware and program code protects the OEM program code so it will only run on the OEM hardware and prevents the program code from being replicated or altered to operate on unauthorized hardware. These cryptographic binding techniques are referred to herein as secure software and hardware association (SSHA).

An embodiment of the present invention may be a method, apparatus, or computer readable medium having computer readable program codes embodied therein for performing the method, of authenticating program code. The method includes retrieving a public asymmetric encryption key associated with an OEM stored in memory. Initial program code is then loaded from program code memory and authenticated by using the public key associated with the OEM retrieved from memory. In certain embodiments, the program code may be boot code. In other embodiments, the pro-ram code may be application software.

In an alternate embodiment in which the initial program code identifies a secure location associated with the OEM storing encrypted program code, the example embodiment method further includes establishing a secure connection to the secure location storing the encrypted program code. A command is then received from the secure location signed by a private asymmetric encryption key associated with the OEM requesting a chip identifier token (ChipID token). In response, a ChipID token is generated by encrypting a chip identifier (ChipID) stored in memory by using the public key associated with the OEM and transmitted to the secure location to be verified by the OEM by matching the ChipID against ChipIDs stored in a database. In some embodiments, the database is created by a semiconductor provider and maintained by the OEM.

If the ChipID is not a match, no encrypted program code in provided. However, if the ChipID is a match, the method includes receiving signed and encrypted program code. The method concludes by authenticating the signed and encrypted program code using the asymmetric public key and decrypting the encrypted program code by using a symmetric code encryption key (CEK) stored in memory. In a preferred embodiment, the CEK is not transmitted during the secure connection, but rather is known as previously provided via an out-of-band communication.

In a further embodiment, the CEK may be replaced by receiving a request signed by the private key associated with the OEM that provides a new symmetric CEK associated with the semiconductor product. In response, the new CEK is retrieved from the request by using the public key associated with the OEM stored in memory. The new CEK is then stored in memory.

The ChipID and CEK may be generated and stored in memory during manufacture of a semiconductor product. Similarly, the public key associated with the OEM may be stored in memory by a semiconductor provider during manufacturer of a semiconductor product. Further, the OEM may use the private key associated with the OEM to decrypt the ChipID token to retrieve the ChipID. In some embodiments, the program code is encrypted by using a CEK decrypted from a CEK token by using the private key associated with the OEM. The CEK token may be associated with the ChipID and stored in the database In one embodiment, an apparatus performing the method may be external to a semiconductor product, such as in circuitry between the semiconductor product and the program code memory. In this embodiment, the apparatus maintains the semiconductor product in a reset state until association of the initial program code and the semiconductor product is verified. In an alternate embodiment, an apparatus performing the method may be internal to a semiconductor product. In this alternate embodiment, the apparatus halts operation of the semiconductor product until association of the initial program code and the semiconductor product is verified.

A further embodiment allows recovery when the private key associated with the OEM is compromised and remote update of the program code. In this embodiment, the method includes transmitting a request to a secure location associated with the OEM requesting updated program code and receiving the updated program code by using a symmetric CEK decrypted from a CEK token stored in a database by using the private key associated with the OEM. The signed and encrypted updated program code is then retrieved by using an asymmetric public key stored in memory and a symmetric CEK stored in memory to decrypt the updated program code.

In an additional embodiment, if the private key associated with an OEM is compromised, the method includes receiving commands encrypted by a symmetric CEK decrypted from a CEK token stored in a database by using the private key associated with the OEM. The commands may be received over a secure physical connection with a semiconductor product to change the public key and a symmetric CEK stored in memory.

SSHA is flexible and provides two modes of operation: (1) OEM hardware will only run OEM software; and (2) OEM software will only run on OEM hardware. Further, SSHA may be based on a "web of trust" (e.g., self-signed certificates) or use a centralized public key infrastructure (PKI) that uses a certificate authority to issue keys.

To realize the security benefits of SSHA, manufacturers do not need to introduce extra steps in the manufacturing process. Rather, with embodiments of the SSHA circuitry, the system can be protected during the first power-on sequence that is typically done during the quality assurance (QA) cycle in the factory prior to shipping of finished goods.

A further embodiment of the present invention is a method of initializing circuitry for securely associating software and hardware. The method includes generating a ChipID associated with a semiconductor product, generating a symmetric CEK associated with the ChipID, and storing a public asymmetric encryption key associated with an OEM, the ChipID, and the CEK in memory. The ChipID may be a random number. Further, the public key associated with the OEM, the ChipID, and the CEK may be stored in non-volatile memory, which may be one time-programmable (OTP) memory.

The method may also include encrypting the ChipID using the public key associated with the OEM to generate a ChipID token, encrypting the CEK using the public key associated with the OEM to generate a CEK token, and storing the ChipID token and the CEK token to a database. The database then may be signed using a private key associated with a semiconductor provider, transferred to the OEM to be maintained, and then destroyed so that the only database remaining is the one to be maintained by the OEM. The database may be created by the semiconductor provider. SSHA may be selectively enabled, for example, by burning a fuse or writing a value to OTP memory.

Example embodiments may be implemented in a form of hardware, firmware, software, and combinations thereof. If implemented in software, the software may be any suitable language, stored on a computer-readable medium, and be loaded and executed by a processor. The processor can be any general or application-specific processor that can execute the software in a manner consistent with the principles of the present invention, as claimed and illustrated by the example embodiments presented herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
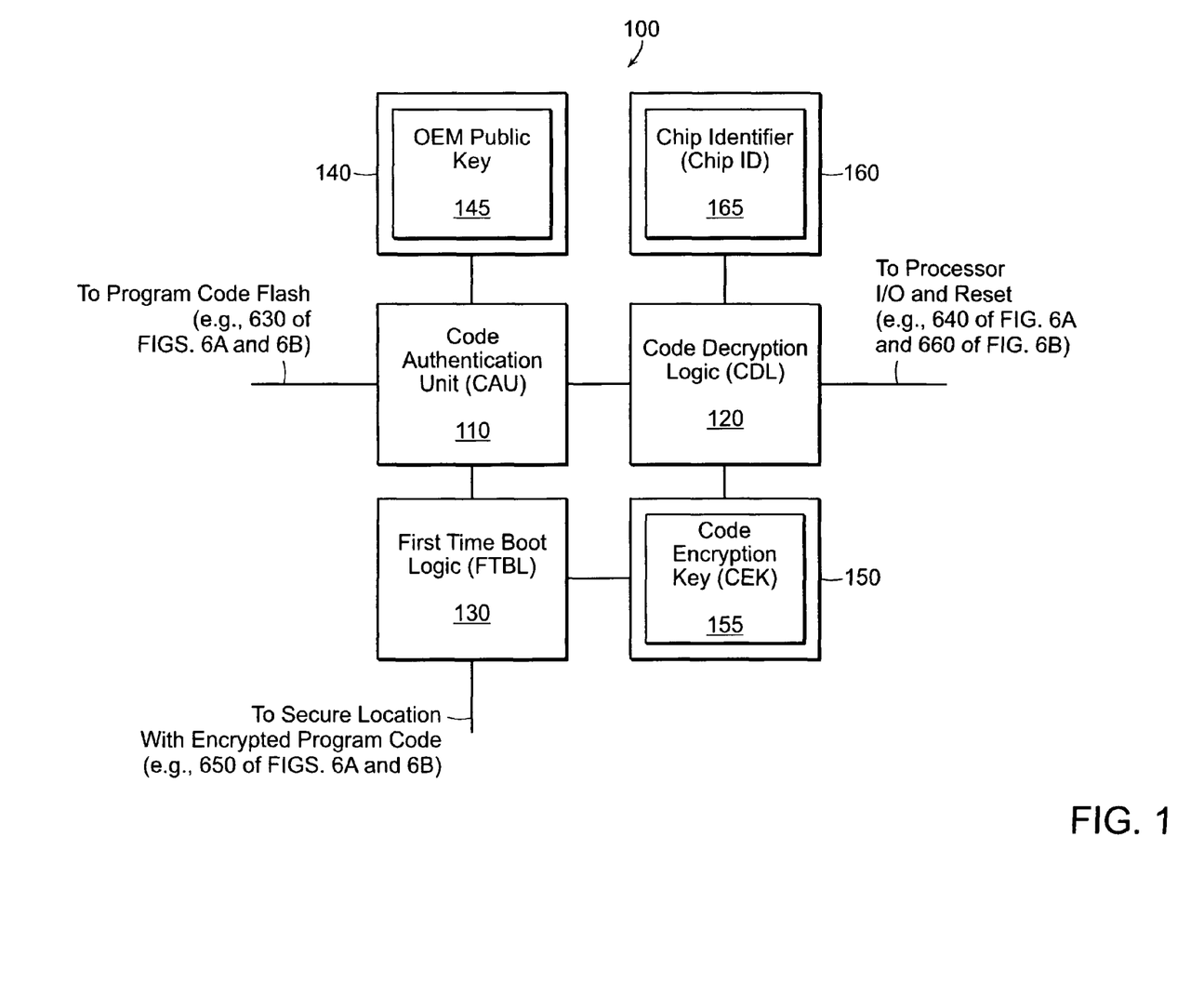
FIG. 1 illustrates a block diagram of an example embodiment of secure software and hardware association (SSHA) circuitry.

FIG. 1 illustrates a block diagram of an example embodiment of secure software and hardware association (SSHA) circuitry 100. As will be discussed below, SSHA includes two modes: (1) original equipment manufacturer (OEM) hardware will only run OEM software; and (2) OEM software will only run on OEM hardware. As illustrated, the SSHA circuitry 100 includes a code authentication unit (CAU) 110, code decryption logic (CDL) 120 and first-time boot logic (FTBL) 130. The SSHA circuitry 100 is configured to be coupled between a processor (e.g., semiconductor 610 of FIGS. 6A and 6B) and program code memory (e.g., program code flash memory 630 of FIGS. 6A and 6B) to control the loading of the program code by the processor. The program code may be boot code or application software. The CAL 110, CDL 120 and FTBL 130 may be programmable logic or in a processor. Further, in certain embodiments, a configurable (e.g., time based) bypass may exist for debugging, development or evaluation purposes.

The SSHA circuitry 100 further includes memory 140 configured to store a public asymmetric encryption key 145 associated with the OEM. The CAU 110 authenticates initial program code. The CAL 110 is configured to retrieve the public key 145 associated with the OEM from the memory 140. The CAU 110 further is configured to load initial program code for the processor from the program code memory. The CAL 110 then authenticates the initial program code for the processor retrieved from the program code memory by using the public key 145 retrieved from the memory 140.

Figure 2:
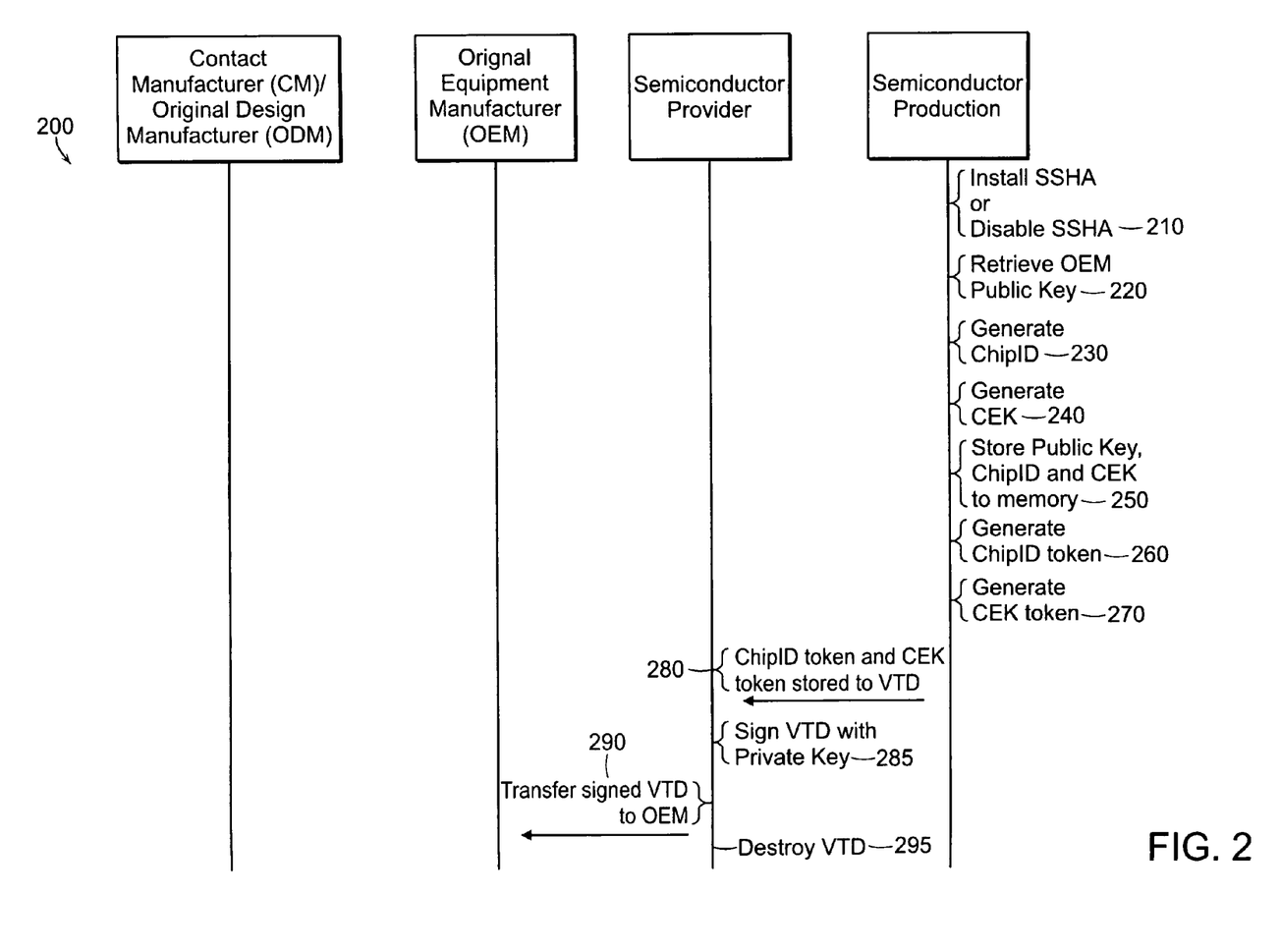
FIG. 2 is a flow diagram illustrating an example embodiment method of SSHA installation.

In particular embodiments in which the initial program code identifies a secure location associated with the OEM (e.g., secure location 650 of FIGS. 6A and 6B) storing encrypted program code (e.g., encrypted program code 655 of FIGS. 6A and 6B), the FTBL 130 establishes a secure connection to the secure location storing the encrypted program code. The FTBL then receives a command from the secure location signed by a private asymmetric encryption key associated with the OEM requesting a chip identifier token (ChipID token) and, in response, generates the ChipID token by encrypting a chip identifier (ChipID) stored in memory by using the public key 145. The FTBL 130 then transmits the ChipID token to the secure location to be verified by the OEM by matching the ChipID against ChipIDs stored in a database (not shown). The database may be maintained by the OEM. If the ChipID is a match, the FTBL 130 receives encrypted program code encrypted by a symmetric code encryption key (CEK) from the database and signed using the OEM private key. The CAU 110 then authenticates the signed encrypted program code by using the public key 145. The CDL then decrypts the authenticated encrypted program code by using a corresponding symmetric CEK 155 stored in memory 150. In a preferred embodiment, the CEK is not transmitted during the secure connection, but rather is known as previously provided via an out-of-band communication FIG. 2 is a flow diagram 200 illustrating an example embodiment method of SSHA installation. During the production of semiconductor products, chips, processors or other embodiments of SSHA circuitry, such as a system-on-a-chip (SOC), a semiconductor provider marks each embodiment of the SSHA circuitry as installed or disabled (210) in a process referred to herein as SSHA installation. Semiconductor products with SSHA installed are referred to herein as SSHA-enabled products. In a preferred embodiment, the semiconductor provider will not ship any semiconductor products without some form of SSHA circuitry installed, either installed or disabled. SSHA may be installed by burning a fuse or setting a flag inside one-time programmable (OTP) memory.

During SSHA installation, a public asymmetric encryption key associated with an OEM (220) is retrieved from a certificate authority. In some embodiments, the OEM itself can be the certificate authority. The OEM public key may use any asymmetric cryptographic standard such as elliptic curve cryptography (ECC) and Rivest Shamir/Adleman (RSA). Further, a CDL (e.g., CDL 120 of FIG. 1) generates a number referred to herein as a ChipID (e.g., ChipID 160 of FIG. 1) (230) and an associated symmetric ChipID encryption key (CEK) (e.g., CEK 155 of FIG. 1) (240). The ChipID is a value used as a unique identifier for the semiconductor product and may be any number, a random number, or associated with the asymmetric public and private key pair. Similarly, the CEK may be any symmetric encryption key or may be associated with the asymmetric public and private key pair. The OEM public key, ChipID and CEK are stored in OTP memory or secure non-volatile memory (250). The ChipID and CEK preferably are not exposed or read-able in plain format. Further, the CEK may be changed over a secure connection by receiving a request signed by an associated asymmetric OEM private key that provides a new symmetric CEK as described further herein.

The ChipID is encrypted by the associated OEM public key to generate a ChipID token (260). Similarly, the CEK is encrypted by the associated OEM public key to generate a CEK token (270). During the SSHA installation process, the ChipID token and CEK token are provided one time to the semiconductor provider to be stored in a Vendor Token Database (VTD) 280. Providing tokens generated by encrypting the ChipID and CEK using the OEM public key is to enforce viewing of the actual ChipID and CEK values by only the OEM who has access to an asymmetric OEM private key. The OEM private key preferably is not revealed to other parties, including the semiconductor manufacturer. Although SSHA installation is managed by the semiconductor provider, in a preferred embodiment, the semiconductor provider does not know the value of the ChipID and CEK and only temporarily knows the values of the ChipID token and CEK token so they may be stored in the VTD. The semiconductor provider then signs the VTD using its private key (285) and transfers the entire VTD to the OEM over a secure connection (290), such as SSL. In a further preferred embodiment, the semiconductor provider then destroys its copy of the VTD (295). Thus, any record of production of the SSHA-enabled products is only available to the OEM as stored in the VTD.

Figure 3A:
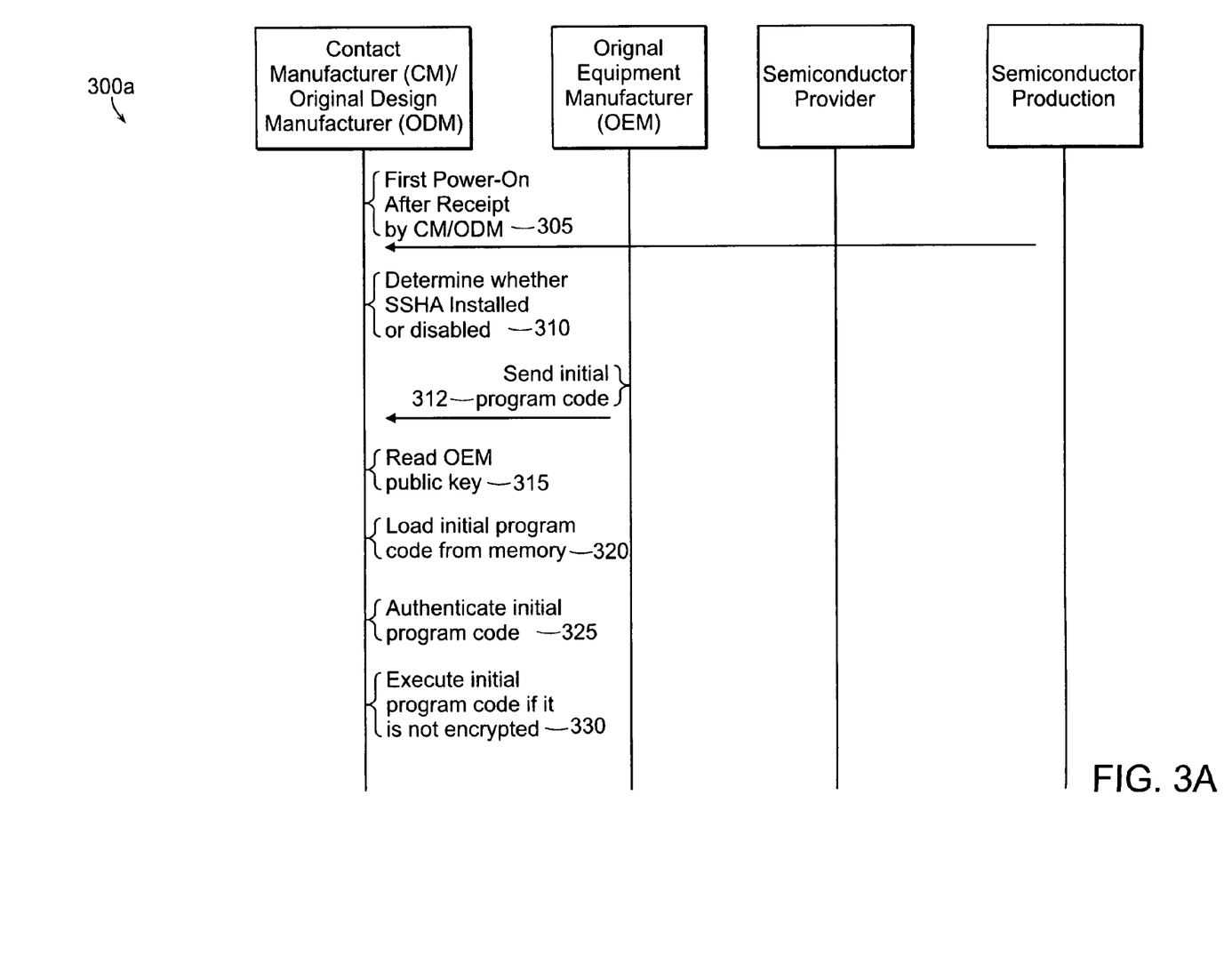
FIG. 3A is a flow diagram illustrating a process flow of a first SSHA mode in which original equipment manufacturer (OEM)-approved hardware only runs OEM-approved program code.

FIG. 3A is a flow diagram 300a illustrating a process flow of a first SSHA mode in which OEM-approved hardware only runs OEM-approved software. Following SSHA installation by the semiconductor provider (e.g., as illustrated in FIG. 2), SSHA-enabled products allow enforcement of an authenticated program code process mode called "OEM-approved hardware only runs OEM-approved software" using the associated OEM public key stored in memory during SSHA installation. As will be discussed below, a further mode may be enabled called "OEM-approved software only runs on OEM-approved hardware."

After SSHA installation by the semiconductor provider, at first power-on of the semiconductor following receipt by a Contract Manufacturer (CM) or Original Design Manufacturer (ODM) (305), embodiments the SSHA circuitry are configured to determine whether SSHA was installed or disabled during SSHA installation (310) by detecting the state of the internal OTP memory or fuse. If SSHA has been disabled permanently, the SSHA circuitry effectively functions as a wire to allow the processor of the semiconductor product to load program code normally.

However, if SSHA has been installed, the SSHA process continues to authenticate initial program code. The initial program code is sent from the OEM (312) and may be in two forms: (1) signed by the OEM private key and unencrypted; or (2) signed by the OEM private key and encrypted using a symmetric CEK. The CAU reads the OEM public key (315) and loads the initial program code from program code memory (320). In this example embodiment, the CAU uses public key infrastructure (PKI) techniques to authenticate the initial program code to ensure it was issued by the OEM (325). In other words, the initial program code must have been signed using the OEM private key to be retrieved successfully by the OEM public key stored in memory during SSHA installation. The PKI scheme may use any asymmetric cryptographic standard such as ECC and RSA.

If the initial program code was signed by the OEM private key but not encrypted, the initial program code is accessible to the processor in a transparent manner and the processor begins the normal program code loading process (330) in the mode "OEM-approved hardware only runs OEM-approved software." However, the initial program code may be a restricted or initialization program code to enforce the mode "OEM-approved software will only run on OEM-approved hardware."

Figure 3B:
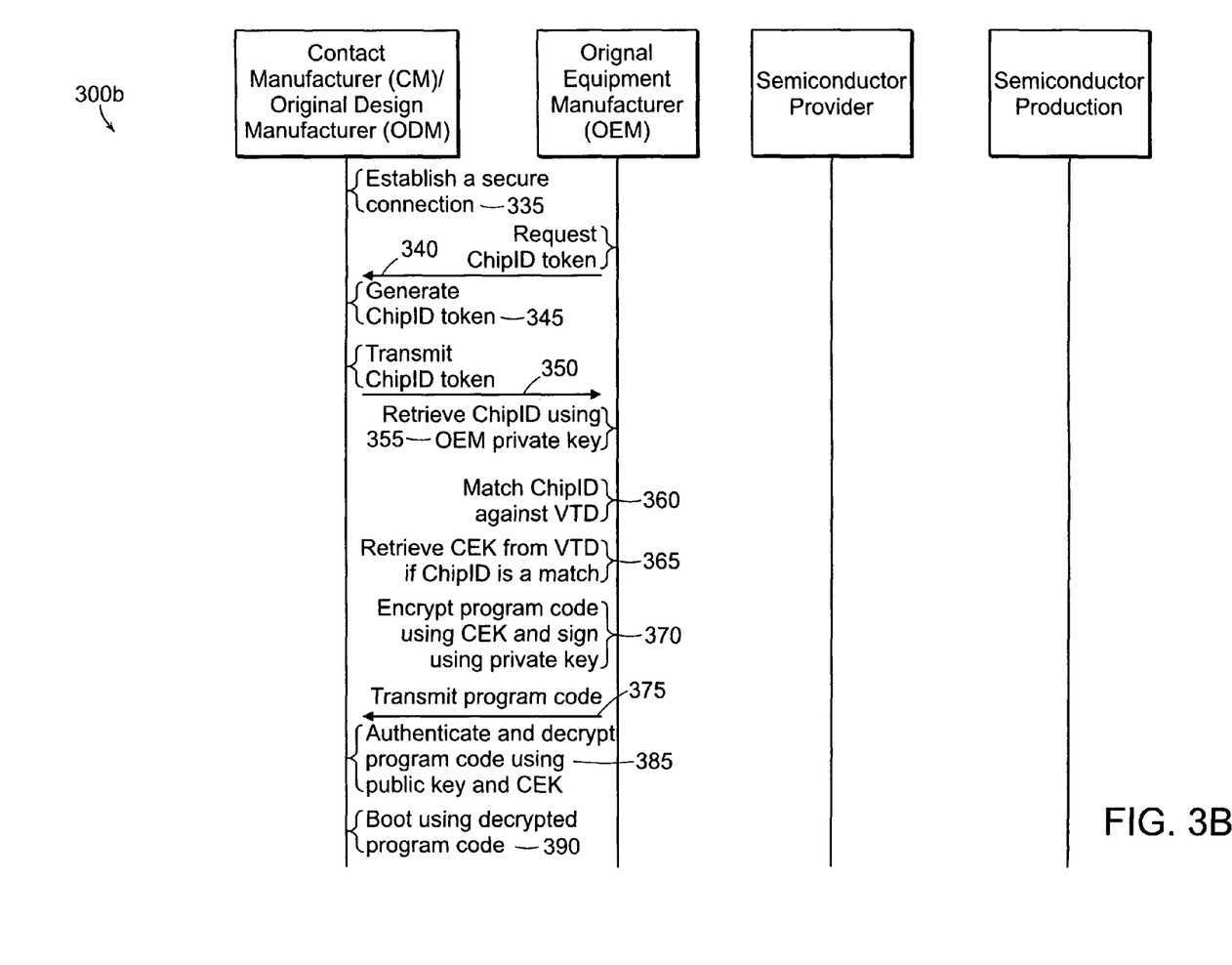
FIG. 3B is a flow diagram illustrating a process flow of a second SSHA mode in which OEM-approved program code only runs on OEM-approved hardware.

FIG. 3B is a flow diagram 300b illustrating a process flow of a second SSHA mode in which OEM-approved software only runs on OEM-approved hardware. In this mode, the authenticated initial program code, such as the initialization program code authenticated as described above with reference to FIG. 3A, is a restricted program code that is used to establish a secure connection with a secure location to get encrypted program code. Such a secure connection is typically a network connection.

To access the encrypted program code, the CDL establishes a secure connection (335), such as a Secure Sockets Layer (SSL) session, with a secure location operated by the OEM that will authenticate the request for encrypted program code and then send the encrypted program code. After the secure connection is established, the secure location requests a ChipID token by sending a command signed using the OEM private key (340). In response, the CDL authenticates the request and encrypts the ChipID using the OEM public key stored in memory to generate a ChipID token (345) and transmits the ChipID token to the secure location (350). The ChipID token is then decrypted using the OEM private key to retrieve the ChipID at the secure location (355). The retrieved ChipID is then matched against ChipIDs stored in the VTD (360).

If the ChipID is a match, the symmetric CEK associated with the ChipID is retrieved from the VTD (365). The CEK is used to encrypt the program code which is the signed by the OEM private key (370). The signed and encrypted program code is then sent to the CDL (375). If the ChipID is not a match, encrypted program code is not provided. Upon receipt of signed and encrypted program code, the CAU authenticates the signed and encrypted program code using the OEM public key stored in memory. Then the CDL decrypts the authenticated encrypted program code using the symmetric CEK stored in memory (385). In a preferred embodiment, the CEK is not exchanged during the secure connection. The CDL can use any symmetric cryptographic algorithms, such as Advanced Encryption Standard (AES) and Data Encryption Standard (DES). After successful CDL decryption, the program code is accessible to the semiconductor in a transparent manner and the semiconductor begins the normal program code loading process (390).

Figure 4:
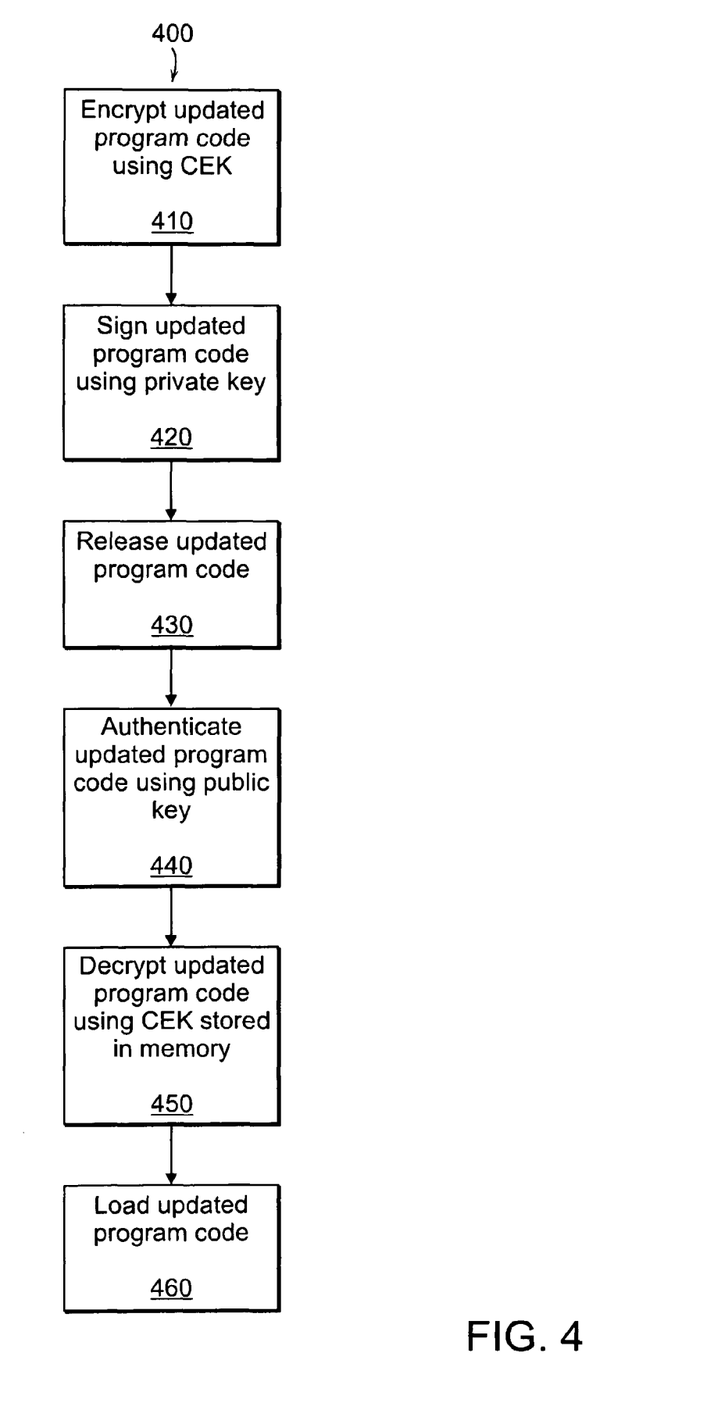
FIG. 4 is a flow diagram illustrating a method by which program code may be updated or replaced.

FIG. 4 is a flow diagram 400 illustrating a method by which program code may be updated or replaced. To update or replace program code, the updated program code is encrypted using the symmetric CEK (410) and signed using the OEM private key (420). The signed and encrypted program code is then released to the OEM's customer base (430). This may be by distribution of a physical disk, a link to a secure location or via a command sent to the semiconductor. An update command sent by the OEM may be encrypted using the symmetric CEK unique to the semiconductor to ensure that boot code or associated application software upgrade is not possible if the OEM's asymmetric private key is compromised. After receipt of the updated program code, the CAU authenticates it as from the OEM using the OEM public key (440). The authenticated encrypted updated program code is then decrypted using the symmetric CEK stored in memory (450). The updated program code then may be loaded (460). Similar to the scenario described above during the first boot, for the mode "OEM-approved software will only run on OEM-approved hardware," the updated program code may not contain actual program code but rather may establish a secure connection from the semiconductor to a secure location operated by the OEM that will deliver new program code encrypted using the associated CEK.

Figure 5:
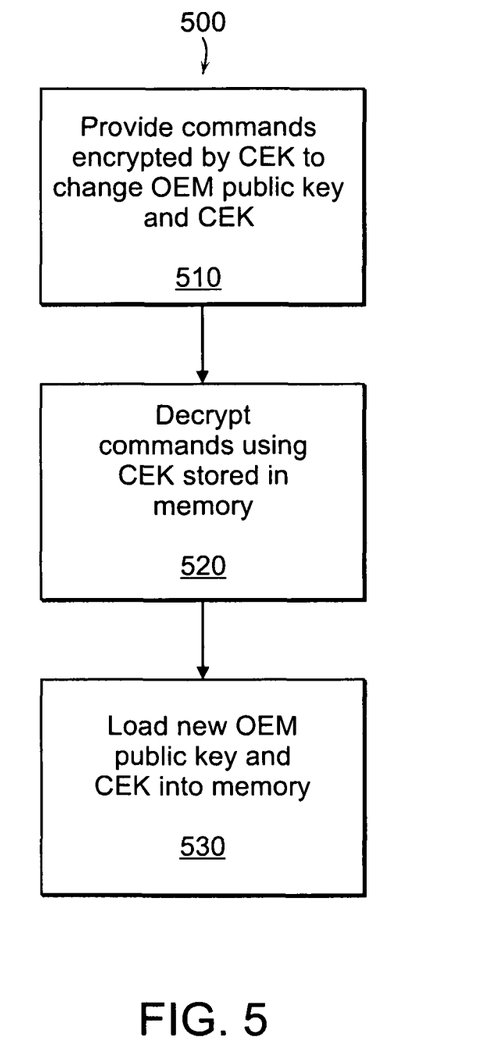
FIG. 5 is a flow diagram illustrating a method by which an OEM public asymmetric encryption key and a symmetric ChipID encryption key (CEK) may be changed if an OEM private asymmetric encryption key has been compromised.

FIG. 5 is a flow diagram 500 illustrating a method by which an OEM public asymmetric encryption key and a symmetric CEK may be changed if an OEM private asymmetric key has been compromised. If the OEM private key is compromised, systems deployed in the field cannot be upgraded remotely because the source of the code cannot be trusted, Rather, the system may be upgraded by a secure physical connection, such as a universal serial bus (USB) memory key. To protect the CEK from physical attacks, such as chip-cover-popping or bit-reads from silicon, the CEK may be masked via a hardware algorithm that uses a random number as a seed, covered in epoxy, or protected with key zeroization hardware. The algorithm to mask the secret key can be any masking or encryption scheme. Key zeroization mechanisms built into the hardware may be used in conjunction with attack prevention techniques described by the Federal Information Processing Standard (FIPS) Publication 140-2.

However, although the OEM private key has been compromised, if the CEK has not been compromised and if the OEM public key and CEK are stored in non-volatile memory, the OEM public key and the CEK may be changed by providing commands encrypted by the symmetric CEK (510) via a secure physical connection. In one embodiment this secure physical connection may connect directly into the SSHA circuitry. Even though the OEM private key is compromised, the encrypted program code will not be compromised because, in a preferred embodiment, the semiconductor product does not provide the symmetric CEK, but rather only accepts new keys and program code after a secure connection. The commands then may be decrypted using the symmetric CEK stored in memory (520). The new OEM public asymmetric key and the new symmetric CEK may be loaded into memory (530)

Figure 6A:
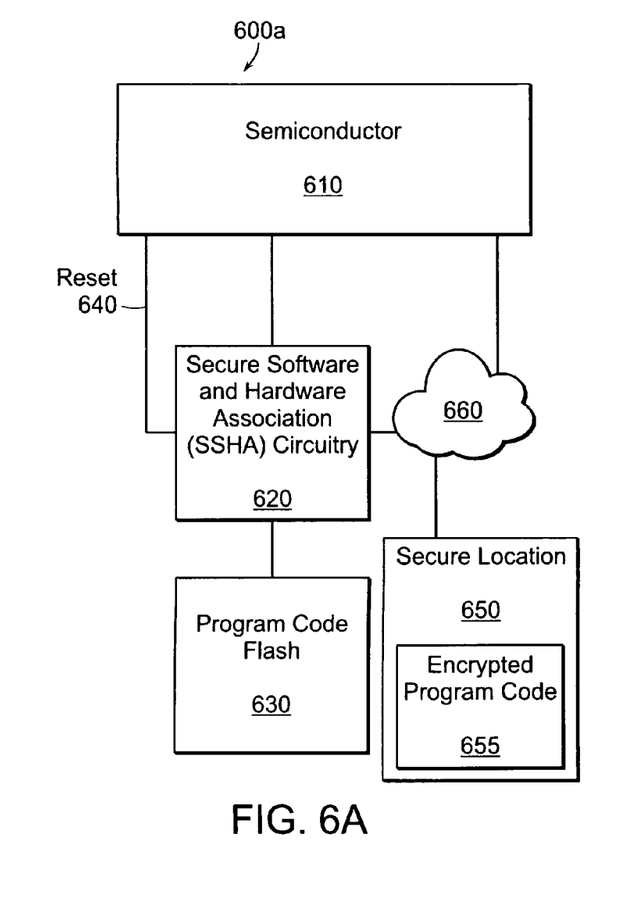
FIG. 6A illustrates a first embodiment of a system having external SSHA circuitry.

FIG. 6A illustrates a first embodiment of a system 600*a* having external SSHA circuitry 620. The system includes a semiconductor 610, SSHA circuitry 620 (e.g., SSHA circuitry 100 of FIG. 1), and program code flash memory 630. In this embodiment, the SSHA circuitry 620 is external to the semiconductor 610 and is coupled between the semiconductor 610 and the program code flash memory 630. In the mode "OEM-approved hardware only runs OEM-approved software," the external SSHA circuitry 620 operates to keep the semiconductor 610 in a reset state along a reset signal path 640 until OEM-approved program code from the program code flash 630 is authenticated. In the mode 'OEM-approved software only runs on OEM-approved hardware," the external SSHA circuitry 620 operates to keep the semiconductor 610 in a reset state along the reset signal path 640 until encrypted OEM program code 655 received from a secure location 650, typically over a network 660, is decrypted successfully.

Figure 6B:
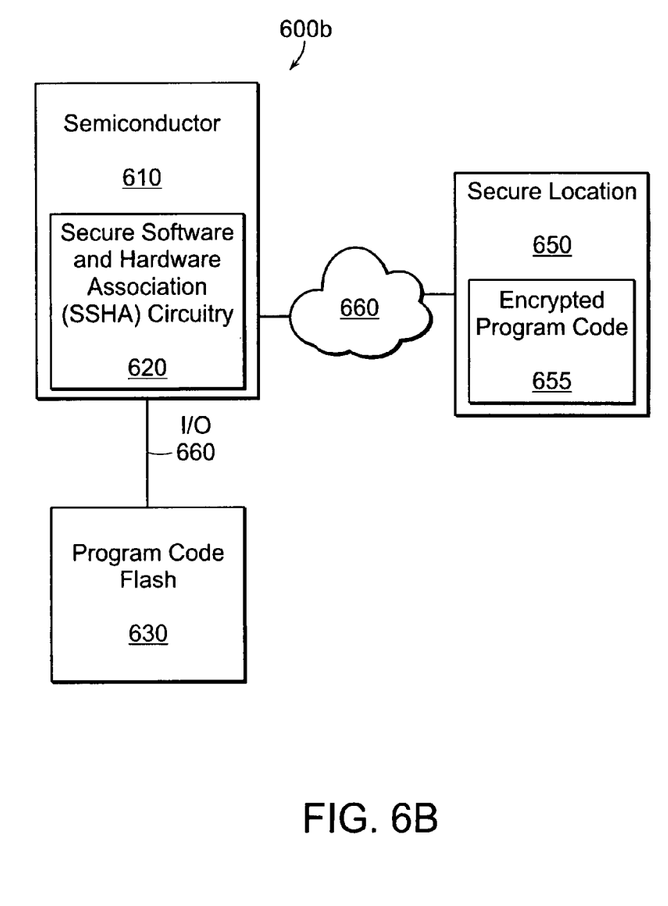
FIG. 6B illustrates a second embodiment of a system having internal SSHA circuitry.

FIG. 6B illustrates a second embodiment of a system 600*b* having internal SSHA circuitry 620. The system includes a semiconductor 610, SSHA circuitry 620 (e.g., SSHA circuitry 100 of FIG. 1), and program code flash memory 630. In this embodiment, the SSHA circuitry 620 is internal to the semiconductor 610. In the mode "OEM-approved hardware only runs OEM-approved software," the internal SSHA circuitry 620 operates to halt operation of the semiconductor 610 until OEM-approved program code from the program code flash 630 is authenticated. In the mode "OEM-approved software only runs on OEM-approved hardware," the internal SSHA circuitry 620 operates to halt operation of the semiconductor 610 along input/output (I/O) 660 until encrypted OEM-approved program code 655 received from a secure location 650, typically over a network 660, is decrypted successfully.

While this invention has been particularly shown and described with references to example embodiments thereof, it will be understood by those skilled in the art that various changes in form and details may be made therein without departing from the scope of the invention encompassed by the appended claims.

Implementations of flow diagrams illustrating example embodiments may be implemented in a form of hardware, firmware, software, and combinations thereof. If implemented in software, the software may be any suitable language, stored on a computer-readable medium, and be loaded and executed by a processor. The processor can be any general or application-specific processor that can execute the software in a manner consistent with the principles of the present invention, as claimed and illustrated by the example embodiments presented herein.

What is claimed is:

1. A method of authenticating boot code of a semiconductor product, the method comprising:
in a hardware processor:
retrieving a public asymmetric encryption key, the public key associated with an original equipment manufacturer (OEM), the public key stored in memory by a provider of the semiconductor product;
loading the boot code from boot code memory, the boot code signed by a private key associated with the public key, the boot code identifying a secure location associated with the OEM storing encrypted program code;
authenticating the boot code by using the public key associated with the OEM during a first power-on sequence of the semiconductor product following installation of the semiconductor product, the authentication being performed internally with respect to the semiconductor product;
establishing a secure connection to the secure location;
receiving a command from the secure location signed by a private asymmetric encryption key associated with the OEM, the command requesting generation of a chip identifier token (ChipID token), the private asymmetric encryption key paired with the public key associated with the OEM;
generating the ChipID token by encrypting a chip identifier (ChipID) stored in memory by using the public key associated with the OEM;
transmitting the ChipID token to the secure location to be verified by the OEM by matching the ChipID against a plurality of ChipIDs stored in a database in the secure location;
receiving encrypted program code signed by the private key associated with the OEM if the ChipID is a match;
authenticating the encrypted program code by using the public key associated with the OEM; and
decrypting the encrypted program code by using a code encryption key (CEK) stored in memory;
wherein the encrypted program code is software.

2. The method of claim 1 further comprising:
receiving a request signed by the private key associated with the OEM and encrypted with CEK that provides a new CEK;
retrieving the new CEK from the request by using the public key associated with the OEM stored in memory and decrypting the request using the CEK; and
replacing the CEK stored in memory with the new CEK.

3. The method of claim 1 wherein the public key associated with the OEM is stored in memory during manufacture of the semiconductor product.

4. The method of claim 1 wherein the ChipID is generated and stored in memory during manufacture of the semiconductor product.

5. The method of claim 4 wherein the ChipID is any number, a random number, or associated with the public and private key pair associated with the OEM.

6. The method of claim 1 wherein the CEK is generated and stored in memory during manufacture of the semiconductor product.

7. The method of claim 6 wherein the CEK is associated with the public and private key pair associated with the OEM.

8. The method of claim 1 wherein the OEM uses the private key associated with the OEM to decrypt the ChipID token to retrieve the ChipID.

9. The method of claim 1 wherein the database is created by the semiconductor provider and maintained by the OEM.

10. The method of claim 1 wherein the encrypted program code is encrypted by using a CEK decrypted from a code encryption key token (CEK token) by using the private key associated with the OEM, the CEK token associated with the ChipID token and stored in the database.

11. The method of claim 1 further comprising performing the authentication in circuitry external to the semiconductor product.

12. The method of claim 11 wherein the circuitry is between the semiconductor product and the program code memory.

13. The method of claim 12 further comprising maintaining the semiconductor product in a reset state until the boot code is authenticated.

14. The method of claim 1 further comprising halting operation of the semiconductor product until the boot code is authenticated.

15. The method of claim 1 further comprising:
detecting whether authentication has been enabled for the semiconductor product; and
if authentication has been enabled for the semiconductor product, performing the authentication, and, if authentication has not been enabled for the semiconductor product, allowing the semiconductor product to perform a normal boot code loading process.

16. The method of claim 1 wherein the OEM is a certificate authority issuing the public key associated with the OEM.

17. The method of claim 1 wherein the authentication uses asymmetric cryptographic algorithms such as elliptic curve cryptography (ECC) and Rivest Shamir Adleman (RSA).

18. The method of claim 1 wherein the authentication uses symmetric cryptographic algorithms such as Advanced Encryption Standard (AES) and Data Encryption Standard (DES).

19. The method of claim 1 further comprising:
transmitting a request to a secure location associated with the OEM requesting updated program code;
receiving encrypted updated program code from the secure location, the encrypted updated program code signed by a private key associated with the OEM and encrypted by using a code encryption key (CEK), the CEK decrypted from a code encryption key token (CEK token) stored in a database by using a private key associated with the OEM;
authenticating the encrypted updated program code by using the public key associated with the OEM; and
retrieving the updated program code by using a CEK stored in memory to decrypt the encrypted updated program code.

20. The method of claim 1 further comprising receiving commands encrypted by a code encryption key (CEK) decrypted from a code encryption key token (CEK token) stored in a database by using the private key associated with the OEM, the commands received over a secure physical connection with the semiconductor product to change the public key and a CEK stored in memory.

21. The method of claim 1 wherein the public key associated with the OEM is stored in memory by the semiconductor provider during manufacture of the semiconductor product.

22. The method of claim 1 further comprising detecting whether a bypass is enabled to prevent the authentication.

23. An apparatus for authenticating boot code of a semiconductor product, the apparatus comprising:
  memory configured to store a public asymmetric encryption key from a provider of the semiconductor product, the public key associated with an original equipment manufacturer (OEM);
  a Code Authentication Unit (CAU) configured to retrieve the public key associated with the OEM from the memory, load the boot code from boot code memory the boot code identifying a secure location associated with the OEM storing encrypted program code, the program code signed by a private key associated with the public key, and authenticate the boot code by using the public key associated with the OEM during a first power-on sequence of the semiconductor product following installation of the semiconductor product, the authentication being performed internally with respect to the semiconductor product;
  a First Time Boot Logic (FTBL) configured to:
    establish a secure connection to the secure location,
    receive a command from the secure location signed by a private asymmetric encryption key associated with the OEM, the command requesting a chip identifier token (ChipID token),
    generate the ChipID token by encrypting a chip identifier (ChipID) stored in memory by using the public key associated with the OEM,
    transmit the ChipID token to the secure location to be verified by the OEM by matching the ChipID against ChipIDs stored in a database, and
    receive encrypted program code if the ChipID is a match; and
  a Code Decryption Logic (CDL) configured to decrypt the encrypted program code by using a code encryption key (CEK) stored in memory;
  wherein the CAU is further configured to authenticate the encrypted program code by using the public key associated with the OEM and wherein the encrypted program code is application software.

24. The apparatus of claim 23 wherein the FTBL is further configured to receive a request signed by the private key associated with the OEM and encrypted with the CEK that provides a new CEK, wherein the CDL is further configured to decrypt the request using the CEK, and wherein the FTBL is further configured to retrieve the new CEK from the request by using the public key associated with the OEM stored in memory, and replace the CEK stored in memory with the new CEK.

25. The apparatus of claim 23 wherein the public key associated with the OEM is stored in memory during manufacture of the semiconductor product.

26. The apparatus of claim 23 wherein the ChipID is generated and stored in memory during manufacture of the semiconductor product.

27. The apparatus of claim 26 wherein the ChipID is any number, a random number, or associated with the public and private key pair associated with the OEM.

28. The apparatus of claim 23 wherein the CEK is generated and stored in memory during manufacture of the semiconductor product.

29. The apparatus of claim 28 wherein the CEK is associated with the public and private key pair associated with the OEM.

30. The apparatus of claim 23 wherein the OEM uses the private key associated with the OEM to decrypt the ChipID token to retrieve the ChipID.

31. The apparatus of claim 23 wherein the database is created by the semiconductor provider and maintained by the OEM.

32. The apparatus of claim 23 wherein the encrypted program code is encrypted by using a CEK decrypted from a code encryption key token (CEK token) by using the private key associated with the OEM, the CEK token associated with the ChipID token and stored in the database.

33. The apparatus of claim 23 wherein the apparatus is external to the semiconductor product.

34. The apparatus of claim 33 wherein the apparatus is between the semiconductor product and the program code memory.

35. The apparatus of claim 34 wherein the apparatus maintains the semiconductor product in a reset state until the boot code is authenticated.

36. The apparatus of claim 23 wherein the apparatus is internal to the semiconductor product.

37. The apparatus of claim 36 wherein the apparatus halts operation of the semiconductor product until the boot code is authenticated.

38. The apparatus of claim 23 wherein the FTBL is further configured to detect whether authentication has been enabled for the semiconductor product, and, if authentication has been enabled for the semiconductor product, perform the authentication, and, if authentication has not been enabled for the semiconductor product, allow the semiconductor to perform a normal boot code loading process.

39. The apparatus of claim 23 wherein the OEM is a certificate authority issuing the public key associated with the OEM.

40. The apparatus of claim 23 wherein the CAU uses asymmetric cryptographic standards such as elliptic curve cryptography (ECC) and Rivest Shamir Adleman (RSA).

41. The apparatus of claim 23 wherein the CDL uses symmetric cryptographic algorithms such as Advanced Encryption Standard (AES) and Data Encryption Standard (DES).

42. The apparatus of claim 23 wherein the FTBL is further configured to transmit a request to a secure location associated with the OEM requesting updated program code, receive encrypted updated program code from the secure location, the encrypted updated program code signed by a private key associated with the OEM and encrypted by using a code encryption key (CEK) decrypted from a code encryption key token (CEK token) stored in a database by using the private key associated with the OEM, wherein the CAU is further configured to authenticate the encrypted updated program code by using the public key associated with the OEM, and the CDL is further configured to retrieve the updated program code by using a CEK stored in memory to decrypt the encrypted updated program code.

43. The apparatus of claim 23 wherein the CDL is further configured to receive commands encrypted by a code encryption key (CEK) decrypted from a code encryption key token (CEK token) stored in a database by using the private key associated with the OEM, the commands received over a secure physical connection with the semiconductor product to change the public key and a CEK stored in memory.

44. The apparatus of claim 23 wherein the public key associated with the OEM is stored in memory by the semiconductor provider during manufacture of the semiconductor product.

45. The apparatus of claim 23 further comprising a bypass configured to prevent the authentication.

46. A method of initializing circuitry for authenticating boot code in a semiconductor product, the method comprising:

in a hardware processor:
generating a public asymmetric encryption key associated with an original equipment manufacturer (OEM);
storing the public asymmetric encryption key in memory on the semiconductor product;
loading boot code to a boot code memory on the semiconductor product, the boot code signed by a private key associated with the public key, the boot code further authenticated by the public key;
generating a chip identifier (ChipID) associated with the semiconductor product;
generating a code encryption key (CEK) associated with the ChipID;
storing the ChipID and the CEK in the memory;
encrypting the ChipID using the public key associated with the OEM to generate a chip identifier token (ChipID token);
encrypting the CEK using the public key associated with the OEM to generate a CEK token; and
storing the ChipID token and the CEK token to a database.

47. The method of claim 46 further comprising:
signing the database by using a private key associated with a semiconductor provider;
transferring the signed database to the OEM to be maintained by the OEM; and
destroying the database created by the semiconductor provider.

48. The method of claim 46 wherein the database is created by the semiconductor provider and maintained by the OEM.

49. The method of claim 46 further comprising enabling the authentication.

50. The method of claim 49 wherein authentication is enabled by burning a fuse.

51. The method of claim 49 wherein authentication is enabled by writing a value to one-time programmable (OTP) memory.

52. The method of claim 46 wherein the ChipID is a random number.

53. The method of claim 46 wherein the public key associated with the OEM, the ChipID, and the CEK are stored in non-volatile memory.

54. The method of claim 23 wherein the non-volatile memory is one-time programmable (OTP) memory.

55. A non-transitory computer readable medium having computer readable program codes embodied therein for authenticating boot code, the computer readable medium program codes performing functions comprising:

retrieving a public asymmetric encryption key, the public key associated with an original equipment manufacturer (OEM), the public key stored in memory by a provider of the semiconductor product;
loading boot code from boot code memory, the program code signed by a private key associated with the public key;
authenticating the boot code by using the public key associated with the OEM during a first power-on sequence of the semiconductor product following installation of the semiconductor product, the authentication being performed internally with respect to the semiconductor product;
identifying a secure location associated with the OEM storing encrypted program code;
establishing a secure connection to the secure location;
receiving a command from the secure location signed by a private asymmetric encryption key associated with the OEM requesting generation of a chip identifier token (ChipID token);
generating the ChipID token by encrypting a chip identifier (ChipID) stored in memory by using the public key associated with the OEM;
transmitting the ChipID token to the secure location to be verified by the OEM by matching the ChipID against ChipIDs stored in a database;
receiving encrypted program code signed by the private key associated with the OEM if the ChipID is a match;
authenticating the encrypted program code by using the public key associated with the OEM; and
decrypting the encrypted program code by using a code encryption key (CEK) stored in memory;
wherein the encrypted program code is application software.

* * * * *